United States Patent
Liu et al.

(10) Patent No.: US 7,047,276 B2
(45) Date of Patent: May 16, 2006

(54) METHOD AND SYSTEM FOR SHARING DATA BETWEEN WIRED AND WIRELESS PLATFORMS

(75) Inventors: Hsiang-Min Liu, Taipei (TW); Shih-Li Wen, Taipei (TW)

(73) Assignee: Inventec Tomorrow Studio Corporation, Taipei (TW)

( * ) Notice: Subject to any disclaimer, the term of this patent is extended or adjusted under 35 U.S.C. 154(b) by 749 days.

(21) Appl. No.: 10/000,550

(22) Filed: Oct. 24, 2001

(65) Prior Publication Data
US 2003/0055880 A1    Mar. 20, 2003

(51) Int. Cl.
*B06F 15/16* (2006.01)

(52) U.S. Cl. .................. 709/201; 709/217; 709/218

(58) Field of Classification Search ............... 709/201, 709/218, 217, 219, 205, 249; 715/733; 707/103 R
See application file for complete search history.

(56) References Cited

U.S. PATENT DOCUMENTS

| | | | | |
|---|---|---|---|---|
| 5,740,161 A | * | 4/1998 | Porter et al. ............... 370/260 |
| 5,841,769 A | * | 11/1998 | Okanoue et al. ............ 370/338 |
| 5,991,760 A | * | 11/1999 | Gauvin et al. ............... 707/10 |
| 6,035,324 A | * | 3/2000 | Chang et al. ............... 709/203 |
| 6,088,702 A | * | 7/2000 | Plantz et al. ............ 707/103 R |
| 6,151,609 A | * | 11/2000 | Truong ....................... 715/505 |
| 6,304,881 B1 | * | 10/2001 | Halim et al. ............... 707/201 |
| 6,356,905 B1 | * | 3/2002 | Gershman et al. .......... 707/10 |
| 6,437,803 B1 | * | 8/2002 | Panasyuk et al. .......... 715/733 |
| 6,466,585 B1 | * | 10/2002 | Le ............................. 370/465 |
| 6,654,607 B1 | * | 11/2003 | Shobatake et al. ......... 455/433 |
| 2001/0013070 A1 | * | 8/2001 | Sasaki ....................... 709/246 |
| 2002/0035574 A1 | * | 3/2002 | Dumas ...................... 707/200 |
| 2002/0078092 A1 | * | 6/2002 | Kim .......................... 707/513 |
| 2002/0087588 A1 | * | 7/2002 | McBride et al. ........... 707/204 |
| 2002/0120696 A1 | * | 8/2002 | Mousseau et al. ......... 709/206 |
| 2002/0138331 A1 | * | 9/2002 | Hosea et al. ................ 705/10 |

OTHER PUBLICATIONS

Person, Ron, and Karen Rose. Special Edition Microsoft Word 97. Indianapolis, IN: Que Corporation, 1996. Chapters 1,3,35.*

* cited by examiner

*Primary Examiner*—Krisna Lim
*Assistant Examiner*—Philip Chea

(57) ABSTRACT

A method and system for sharing data between wired and wireless platforms are proposed, for allowing a user to read data provided by a first platform via wired or wireless communication, and to submit a request for publishing edited data to the first platform, wherein a second platform examines the request and offers permission for publishing the edited data, so that a user who logins the first platform is able to read the published data.

13 Claims, 4 Drawing Sheets

METHOD AND SYSTEM FOR SHARING DATA BETWEEN WIRED AND WIRELESS PLATFORMS

FIELD OF THE INVENTION

The present invention relates to methods and systems for sharing data between wired and wireless platforms, and more particularly, to a method and system for sharing data between wired and wireless platforms, in which data can be published via wired and wireless networks, so as to allow a user to obtain the published data as required.

BACKGROUND OF INVENTION

Although technology of electronic communication and internet is highly developed, some electronic products are still short in application. For example, a mobile phone functions in e-mailing, downloading pictures or rings from a web page server, or the like; however, a user cannot be directly connected to the web page server by using the mobile phone, instead, a computer device is necessarily used to establish the connection via the internet to the web page server.

Moreover, with development of rapid information transmission, people are allowed to inquire desired information, browse news and send messages in real time by using a computer via a network; this therefore provides people with much convenience in data communication. However, in the case of no computer or network available, information retrieval and data transmission cannot be immediately performed.

Therefore, how to make a user obtain required information and publish data in real time is a critical problem to solve.

SUMMARY OF THE INVENTION

A primary objective of the present invention is to provide a method and system for sharing data between wired and wireless platforms, for allowing a user to publish self-edited data and download published data by using a carry-on electronic device.

In accordance with the foregoing and other objectives, the present invention proposes a method and system for sharing data between wired and wireless platform. The method for sharing data between wired and wireless platform of the invention allows a user to read data provided by a first platform via wired or wireless communication, and to submit a request for publishing edited data to the first platform, wherein a second platform examines the request and offers permission for publishing the edited data, and then a user who logins the first platform is able to read the published data.

The method for sharing data between wired and wireless platform comprises the steps of: (1) connecting a user via a computer device to the first platform; (2) establishing a dedicated editing file via the first platform corresponding to user's data of the user; (3) determining via the first platform if the user selects an editing function, wherein if the editing function is selected, then step (4) is followed; or else, the step (3) is repeated; (4) providing the editing function for the user via the first platform, and storing edited data in the editing file, which is then stored in an editing database of the first platform; (5) determining via the first platform if the user desires to publish the editing file, wherein if the editing file desires to be published, then step (6) is followed; or else, the step (5) is repeated; (6) reading the editing file from the editing database via the first platform, and transmitting the editing file through a network to the second platform, which receives and stores the editing file in a publishing database of the second platform, so as to allow an examiner at a terminal device to read and examine the editing file through the network; (7) determining via the second platform if a permission message for publishing the editing file is transmitted from the examiner, wherein if the permission message is received by the second platform, then step (8) is followed; or else, the step (7) is repeated; (8) reading the editing file with permission in publication from the display-to-be database via the second platform, and transmitting the editing file through the network to a display database of the first platform; (9) determining via the first platform if a reading request is transmitted as a wireless transmission signal from a carry-on electronic device, wherein if the reading request is not transmitted from the carry-on electronic device, the first platform retrieves required data for the user from the display database of the first platform, and transmits the retrieved data to a computer device of the user for browsing; or else, step (10) is followed; (10) retrieving the required data for the user from the display database via the first platform, and converting the retrieved data into a data form to be displayed on the carry-on electronic device; and (11) transmitting the converted data to the carry-on electronic device of the user for browsing.

The system for sharing data between wired and wireless platforms of the invention comprises: a first platform for providing service of browsing or downloading published data, editing data and publishing the edited data for a user who logins the first platform, and including a display database for storing the published data to be read, downloaded or browsed by the user; a transmission interface for receiving an input signal transmitted from a computer device of the user via a wired network or from a carry-on electronic device of the user via a wireless network, so as to allow the first platform to operate according to the input signal, wherein the transmission interface converts the input signal as a wireless transmission signal from the carry-on electronic device to be operated by the first platform, and then converts an operated result into a data form readable for the carry-on electronic device prior to transmitting the operated result via the first platform to the carry-on electronic device; a user's database for storing user's data of the user who logins the first platform, wherein the user's data include a login account, an identification code and a communication number; and an editing database for establish an editing file corresponding to the user's data of the user, so as to allow the user to edit data and store the edited data in the editing file; and a second platform for examining the editing file of the user for publication, and including a display-to-be database for storing the editing file of the user transmitted from the first platform, so as to allow an examiner at a terminal device to be connected to the second platform via a network and to download the editing file from the display-to-be database for examination, wherein if a permission message for publishing the editing file is transmitted from the examiner to the second platform, the second platform transmits the editing file with permission in publication to the display database of the first platform for storage.

BRIEF DESCRIPTION OF THE DRAWINGS

The present invention can be more fully understood by reading the following detailed description of the preferred embodiments, with reference made to the accompanying drawings wherein.

DETAILED DESCRIPTION OF THE PREFERRED EMBODIMENT

Figure 1:
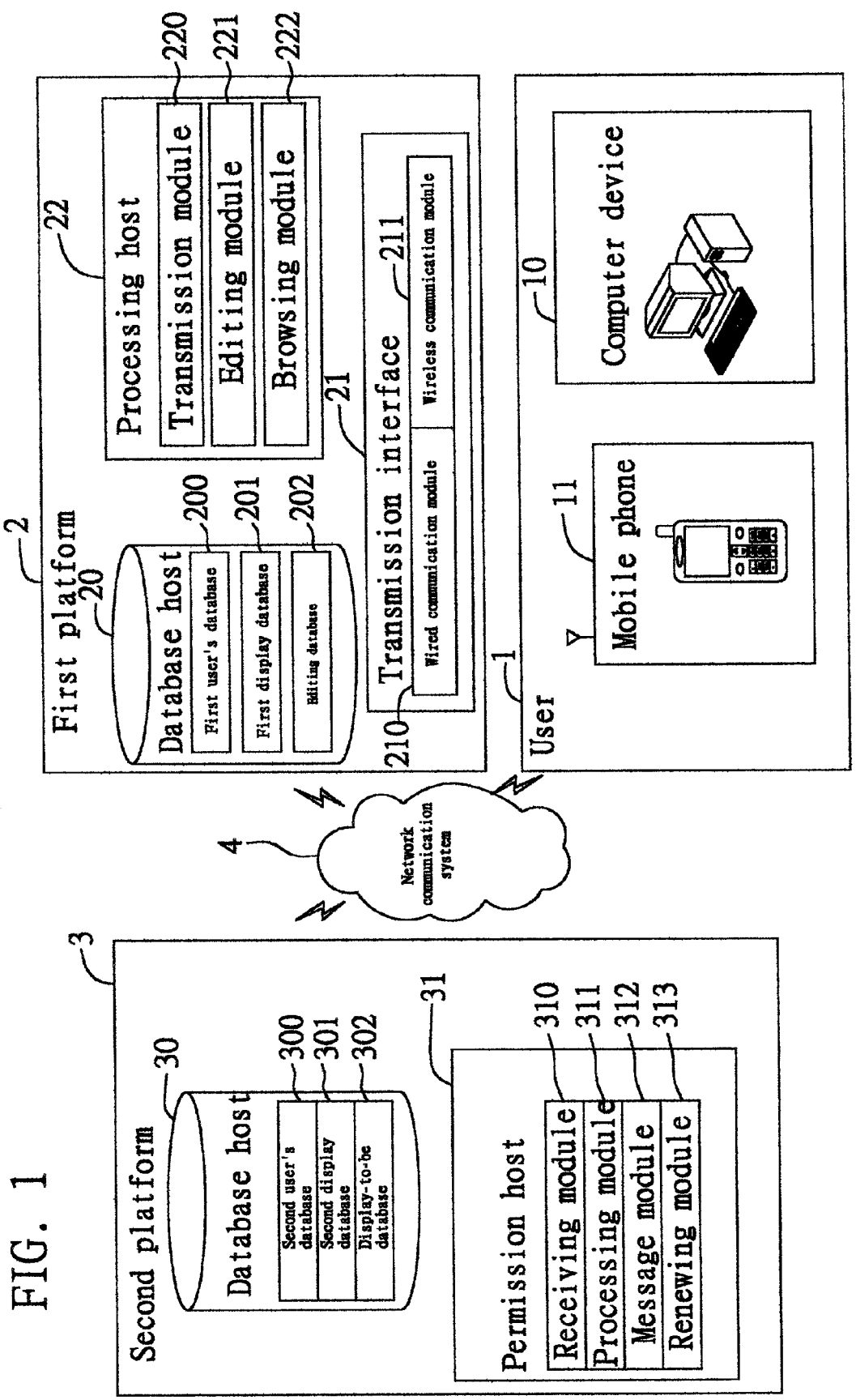
FIG. 1 is a schematic block diagram showing basic architecture of a system for sharing data between wired and wireless platforms of the invention.

Referring to FIG. 1, it illustrates basic architecture of a system for sharing data between wired and wireless platforms of the invention. As shown in the drawing, the system for sharing data between wired and wireless platforms comprises: a user 1, a first platform 2 and a second platform 3, which are connected to each other via a network communication system 4. The network communication system 4 includes e.g. a wireless network consisting of a plurality of bases (not shown), wired internet, etc. Therefore, in the use of the network communication system 4 with wireless and wired architecture, the user 1 can send and download data via a network with no time and spatial limits. An operational mode e.g. wireless application protocol (WAP) is employed by the bases of the wireless network, allowing the user 1 at a mobile phone 11 to transmit and receive messages in a wireless manner. Since the internet and WAP are conventional systems in the art, their functions and internal architecture are not further described herein.

The first platform 2 is used to provide a browsing and downloading platform for the user 1 to browse and download published data, and to provide an editing platform for the user 1 to edit personal data, as well as to provide a display platform for the user 1 to publish the edited data. The second platform 3 is used to provide a permission platform to display the edited data to be published by the user 1 and received by the first platform 2. The displayed data include e.g. journal articles, instant news, personal writings, etc., which require permission from a third party (i.e. the second platform 3) to be published and displayed.

The first platform 2 includes a database host 20 for storing a first user's database 200, a first display database 201 and an editing database 202; a processing host 22 for storing a transmission module 220, an editing module 221 and a browsing module 222; and a transmission interface 21 having a wireless communication module 210 and a wired communication module 211. The second platform 3 includes a database host 30 for storing a second user's database 300, a second display database 301 and a display-to-be database 302; and a permission host 31 for storing a receiving module 310, a processing module 311, a message module 312 and a renewing module 313.

First, before the user 1 can login the first platform 2 via a computer device 10 through wired internet or via the mobile phone 11 through a wireless network, the user 1 needs to be identified in identity, that is, the first platform 2 requests the user 1 to input a login account, an identification code and a mobile communication number required for the identity identification. If the user 1 first logins the first platform 2, the user 1 can apply for registration for the first platform 2, so as to obtain authorization to browse or download required data, edit personal data, or publish the edited data by using the first platform 2. Further, dedicated user's data of the user 1 generated in the registration application are stored by the first platform 2 in the first user's database 200, and the first platform 2 establishes an editing file corresponding to the user's data, for allowing the user 1 to perform an editing process, wherein a login account and an identification code of the user's data can be used as an identification number of the editing file, and the editing file is stored in the editing database 202. The first display database 201 is used to store published and displayed data, for allowing the user 1 who logins the first platform 2 to freely browser or download the data.

If the user 1 desires to construct connection to the first platform 2 via the computer device 10 through the wired internet, the wired communication module 211 of the transmission interface 21 receives a request inputted by the user, and prompts the processing host 22 to perform associated processes corresponding to the request. If the user 1 at the computer device 10 submits a browsing request, the browsing module 222 is prompted to read published data from the first display database 201 and display the data on a browser (not shown) of the computer device 10. If the user 1 submits a downloading request, the transmission module 220 transmits published data required by the user 1 via the wired communication module 211 through the wired internet to the computer device 10 of the user 1 for storage. If the user 1 submits an editing request, the editing module 221 searches in the editing database 202 for an editing file corresponding to a login account and an identification code of user's data of the user 1, so as to display content of the searched editing file on the browser of the computer device 10 of the user 1 for editing. After the edited editing file is stored in the editing database 202, if the user 1 submits a display request, the editing module 221 prompts the transmission module 220 to transmit the editing file to be displayed to the second platform 3.

On the other hand, if the user 1 desires to construct connection to the first platform 2 via the mobile phone 11 through the wireless network, the wireless communication module 210 of the transmission interface 21 receives a request inputted by the user 1, and prompts the processing host 22 to perform associated processes corresponding to the request. Since the processes performed by the processing host 22 herein are similar to those described above for the use 1 connected to the first platform 2 via the computer device 10, they are not further detailed herein, with the only depiction in exemplification of the transmission interface 21 of the first platform 2. Upon receiving a connection signal from the mobile phone 11 for loginning the first platform 2, the wireless communication module 210 converts the received wireless signal. For example, if the user 1 uses a WAP mobile phone to submit a connection request, the wireless communication module 210 converts wireless markup language (WML) used in the WAP into hypertext markup language (HTML) executed by the first platform 2. On the contrary, when the first platform 2 completes the execution and desires to transmit executed results to the mobile phone 11, the wireless communication module 210 converts the HTML used in the first platform 2 into the WML executable for the mobile phone 11. Therefore, in the use of the wired and wireless communication service provided by the first platform 2, besides the computer device, the mobile phone 11 can also be used to construct connection to world wide web (WWW) for data and service retrieval.

In the above mentioned, when the first platform 2 establishes user's data for a newly registered user and stores the user's data in the first user's database 200, the transmission module 220 is prompted by the first platform 2 to transmit the user's data in the first user's database 200 to the second platform 3. Upon receiving the user's data, the receiving module 310 of the second platform 3 stores the received data in the second user's database 300, so that user's data stored in the first user's database 200 are the same as those stored in the second user's database 300.

Next, when the first platform 2 transmits an editing file of the user 1 to the second platform 3 for display, the receiving module 310 receives the editing file and transmits it to the display-to-be database 302 for storage. The display-to-be database 302 allows an examiner at a terminal device to be connected to the second platform 3 and download the editing file for examination from the display-to-be database 302. After the examiner transmits a permission message for displaying content of the editing file to the second platform 3, the renewing module 313 is prompted by the second platform 3 to store the editing file in the second display database 301. Further, the second platform 3 retrieves an e-mail address contained in dedicated user's data from the second user's database 300 corresponding to the user 1, and the message module 312 is prompted by the second platform 3 to transmit the permission message via e-mail to a mailbox server (not shown) of the user 1 according to the e-mail address of the user 1, so as to allow the user 1 to read the e-mail via the computer device 10 through network connection to the mailbox server. Alternatively, the second platform 3 can retrieve a communication number contained in the dedicated user's data from the second user's database 300 corresponding to the user 1, and the message module 312 is prompted by the second platform 3 to transmit the permission message via short text to a message center (not shown) of the user 1 according to the communication number of the user 1, so as to allow the user 1 to read the short text via the mobile phone 11 through wireless network connection to the message center. Then, the processing module 311 is prompted by the second platform 3 to retrieve the editing file with permission for display from the second display database 301, and transmit the editing file to the first display database 201 of the first platform 2, so that the editing file can be browsed by a user 1 who logins the first platform 2.

Figure 2A:
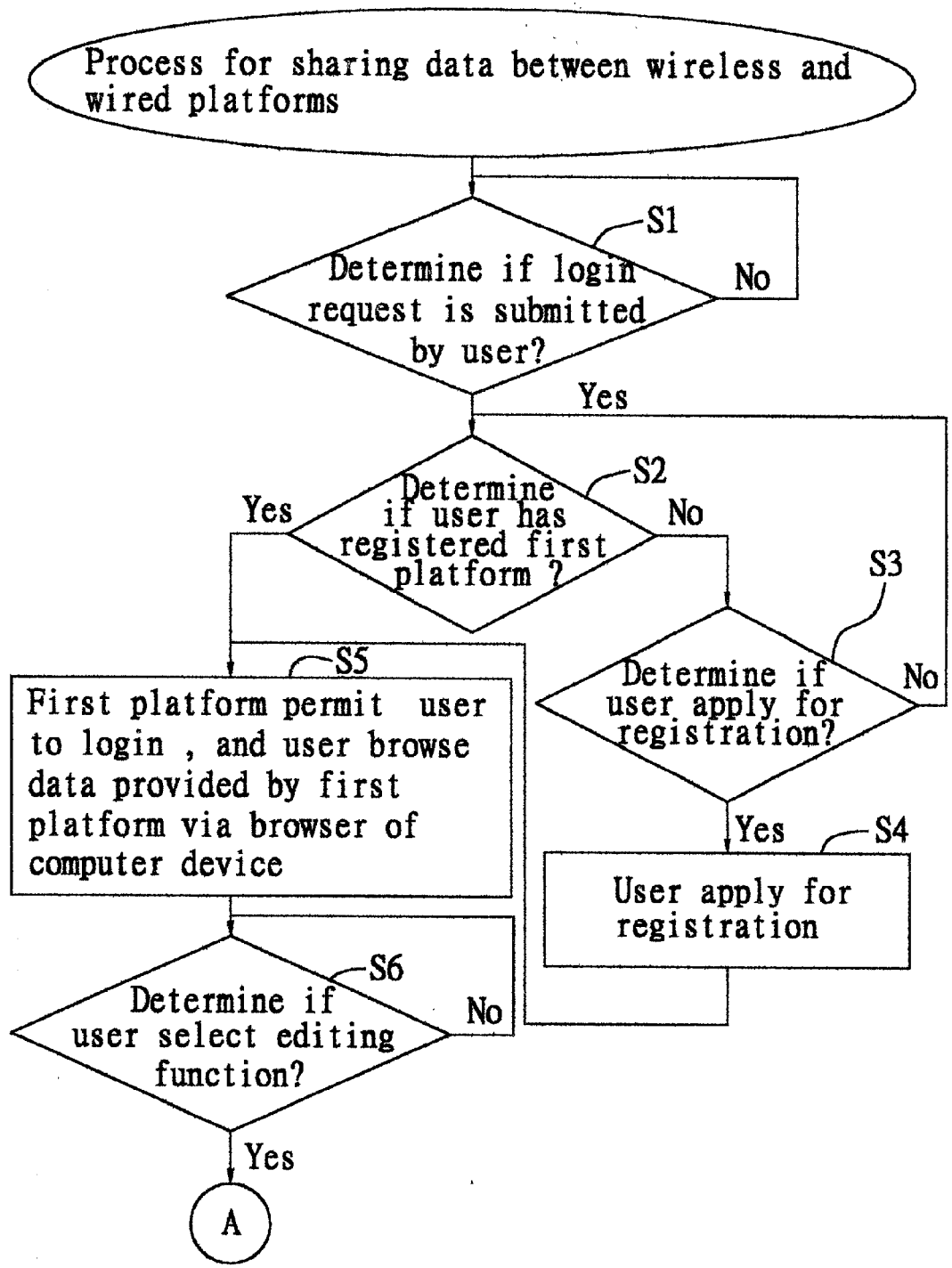
FIGS. 2(A)–2(C) are schematic diagrams depicting a method for sharing data between wired and wireless platforms in the use of a system for sharing data between wired and wireless platforms of the invention.
Figure 2B:
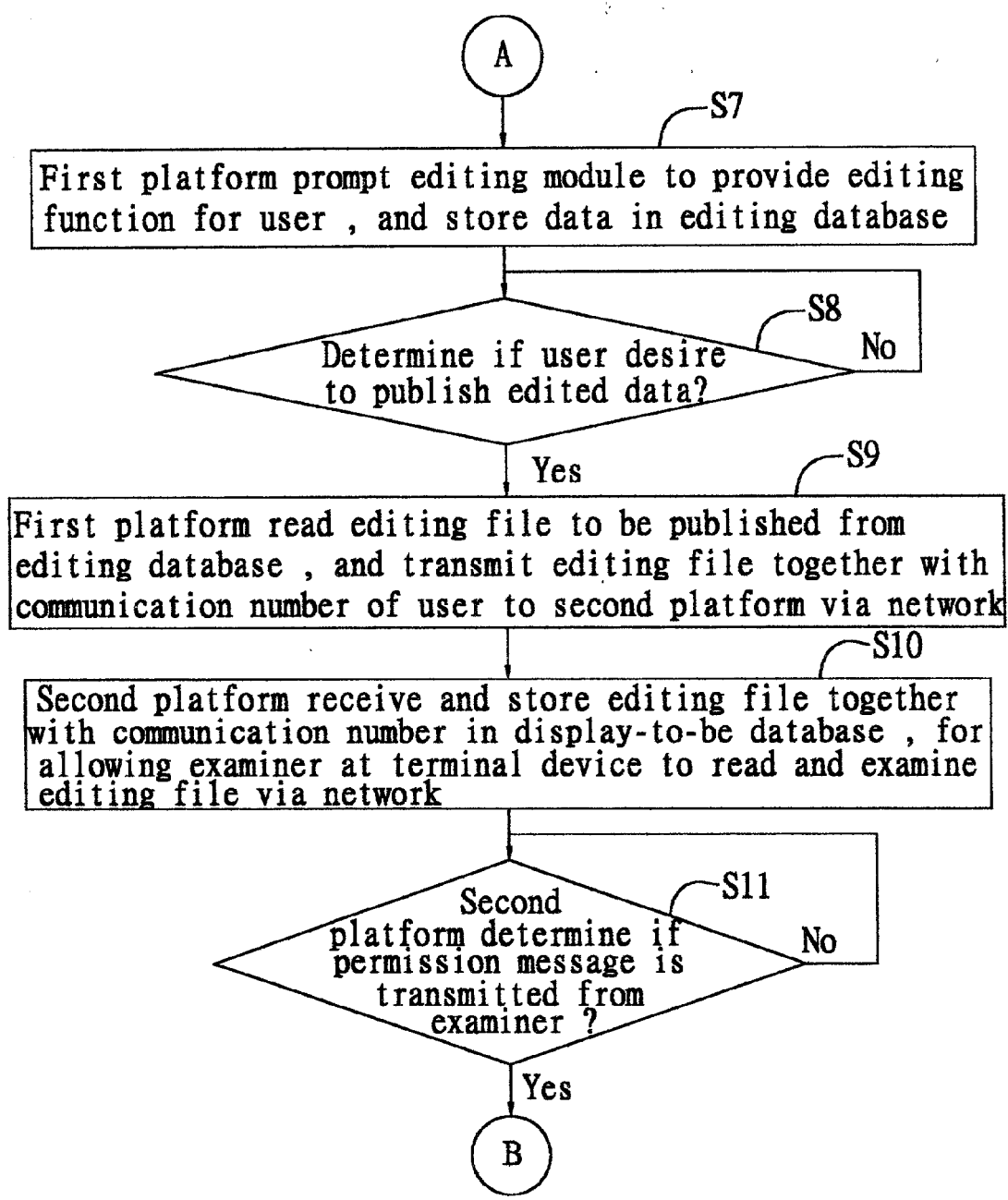
Figure 2C:
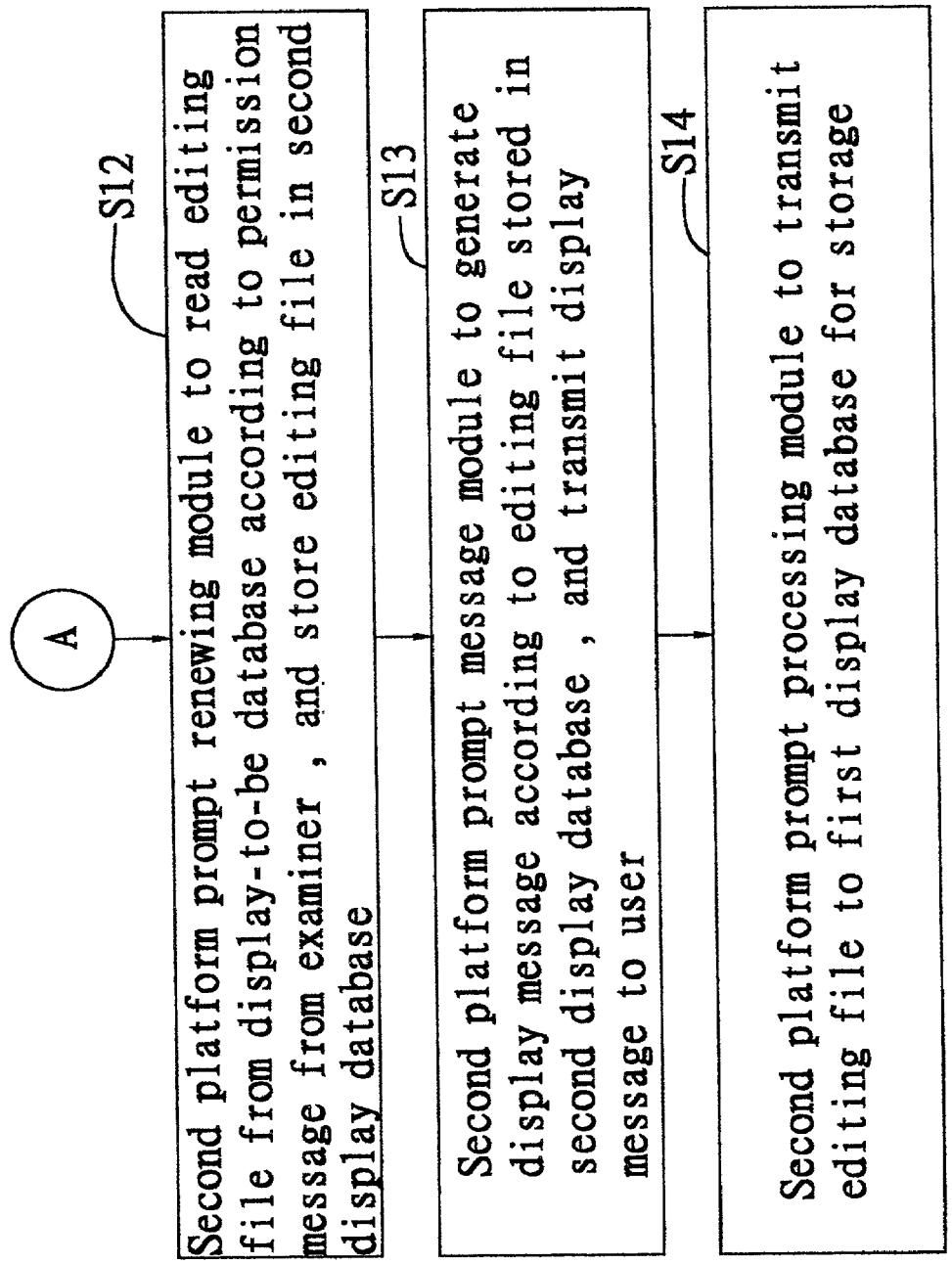

Referring to FIGS. 2(A)–2(C), they illustrate a method for sharing data between wired and wireless platforms in the use of a system for sharing data between wired and wireless platforms of the invention. The following description is made with reference to FIGS. 1 and 2(A)–2(C).

First in step S1, a first platform 2 determines if a user 1 submits a login request. If the login request is received, then step S2 is followed; or else, the step S1 is repeated.

In step S2, the first platform 2 determines if the user 1 has registered in the first platform 2. If the user 1 has registered in the first platform 2, then step S5 is followed; or else, step S3 is followed.

In step S3, the first platform 2 determines if the user 1 applies for registration for the first platform 2. If the registration is applied, then step S4 is followed; or else, the step S2 is repeated.

In step S4, the user 1 applies for the registration for the first platform 2, and needs to input user's data including a login account, an identification code and a mobile communication number, etc. The user's data are stored in a first user's database 200, and then step S5 is followed.

In step S5, the first platform 2 permits the user 1 to login, and the user 1 can browse data provided by the first platform 2 by using a browser of a computer device 10. Thereafter, step S6 is followed.

In step S6, the first platform 2 determines if the user 1 selects an editing function. If the editing function is selected, then step S7 is followed; or else, the step S6 is followed.

In step S7, the first platform 2 prompts an editing module 221 to establish an editing file corresponding to the user's data of the user 1, for allowing the user 1 to store edited data therein, and the editing file is stored in an editing database 202. Thereafter, step S8 is followed.

In step S8, the first platform 2 determines if the user 1 desires to publish the editing file. If the user 1 desires to publish the editing file, then step S9 is followed; or else, the step S8 is repeated.

In step S9, the first platform 2 reads the editing file to be published by the user 1 from the editing database 202, and transmits the editing file together with the communication number of the user 1 to a second platform 3 via a network communication system 4. Thereafter, step S10 is followed.

In step S10, a receiving module 310 of the second platform 3 receives and stores the editing file together with the communication number in a display-to-be database 302, for allowing an examiner at the computer device 10 to read and examine the editing file for display via the network communication system 4. Thereafter, step S11 is followed.

In step S11, the first platform 2 determines if a permission message for displaying the editing file is transmitted from the examiner. If the permission message is received by the first platform 2, then step S12 is followed; or else, the step S11 is repeated.

In step S12, the second platform 3 prompts a renewing module 313 to read the editing file from the display-to-be database 302 according to the permission message transmitted from the examiner, and store the editing file in a second display database 301. Thereafter, step S13 is followed.

In step S13, the second platform 3 prompts a message module 312 to generate a display message of permission for displaying the editing file stored in the second display database 301, and transmits the display message to the user 1. Thereafter, step S14 is followed.

In step S14, the second platform 3 prompts a processing module 311 to transmit the editing file via the network communication system 4 to a first display database 201 for storage, so that the editing file can be retrieved by a user 1 who logins the first platform 2.

In conclusion from the above-mentioned, a user 1 can login the first platform 2 via a wired platform (such as a computer device 10 connected to a web) and a wireless platform (such as a WAP mobile phone 11), so as to retrieve published data from the first display database 201. This therefore provides the user 1 with an interface for freely browsing, editing and downloading, and also data edited by the user 1 can be examined for display, in the use of the method and system for sharing data between wired and wireless platforms of the invention.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for sharing data between wired and wireless platforms, for allowing a user to read data provided by a first platform via wired or wireless communication, and to submit a request for publishing edited data to the first platform, wherein a second platform examines the request and offers permission for publishing the edited data, and then a user who logins the first platform is able to read the published data; the method comprising the steps of:

(1) connecting a user via a computer device to the first platform;

(2) establishing a dedicated editing file via the first platform corresponding to user's data of the user;

(3) determining via the first platform if the user selects an editing function, wherein if the editing function is selected, then step (4) is followed; or else, the step (3) is repeated;

(4) providing the editing function for the user via the first platform, and storing edited data in the editing file, which is then stored in an editing database of the first platform;

(5) determining via the first platform if the user desires to publish the editing file, wherein if the editing file desires to be published, then step (6) is followed; or else, step (5) is repeated;

(6) reading the editing file from the editing database via the first platform, and transmitting the editing file through a network to the second platform, which receives and stores the editing file in a publishing database of the second platform, so as to allow an examiner at a terminal device to read and examine the editing file through the network;

(7) determining via the second platform if a permission message for publishing the editing file is transmitted from the examiner, wherein if the permission message is received by the second platform, then step (8) is followed; or else, the step (7) is repeated;

(8) reading the editing file with permission in publication from a display-to-be database via the second platform, and transmitting the editing file through the network to a display database of the first platform;

(9) determining via the first platform whether a reading request is transmitted as a wireless transmission signal from a carry-on electronic device; wherein if the reading request is not transmitted from the carry-on electronic device, the first platform retrieves required data from the user from the display database of the first platform, and transmits the retrieved data to a computer device of the user for browsing; if the reading request is transmitted as a wireless transmission signal from a carry-on electronic device, then step (10) is followed;

(10) retrieving the required data for the user from the display database via the first platform, and converting the retrieved data into a data from to be displayed on the carry-on electronic device; and

(11) transmitting the converted data to the carry-on electronic device of the user for browsing.

2. The method of claim 1, wherein the wired communication is network connection established between the computer device of the user and the first platform, so as to allow the user to browse and edit data via a browser after logging into the first platform.

3. The method of claim 1, wherein the wireless communication allows the user to login the first platform through wireless transmission via the carry-on electronic device, and to download data transmitted from the first platform.

4. The method of claim 1, wherein the published data include contents of news, books, journals or magazines.

5. The method of claim 1, wherein the carry-on electronic device is a mobile phone.

6. The method of claim 1, wherein the carry-on electronic device is a personal digital assistant (PDA).

7. The method of claim 1, wherein the carry-on electronic device is a notebook computer.

8. The method of claim 5, wherein the first and second platforms are established by a server.

9. A system for sharing data between wired and wireless platforms, comprising;

a first platform for providing service of browsing or downloading published data, editing data and publishing the edited data for a user who logins the first platform, and including a display database for storing the published data to be read, downloaded or browsed by the user; a transmission interface for receiving an input signal transmitted from a computer device of the user via a wired network or from a carry-on electronic device of the user via a wireless network, so as to allow the first platform to operate according to the input signal, wherein the transmission interface converts the input signal as a wireless transmission signal from the carry-on electronic device to be operated by the first platform, and then converts an operated result into a data form readable for the carry-on electronic device prior to transmitting the operated result via the first platform to the carry-on electronic device; a user's database for storing user's data of the user who logins the first platform, wherein the user's data include a login account, an identification code and a communication number; and an editing database for establish an editing file corresponding to the user's data of the user, so as to allow the user to edit data and store the edited data in the editing file; and a second platform for examining the editing tile of the user for publication, and including a display-to-be database for storing the editing file of the user transmitted from the first platform, so as to allow an examiner at a terminal device to be connected to the second platform via a network and to download the editing file from the display-to-be database for examination, wherein if a permission message for publishing the editing file is transmitted from the examiner to the second platform, the second platform transmits the editing file with permission in publication to the display database of the first platform for storage.

10. The system of claim 9, wherein the carry-on electronic device is a mobile phone.

11. The system of claim 9, wherein the carry-on electronic device is a personal digital assistant (PDA).

12. The system of claim 9, wherein the carry-on electronic device is a notebook computer.

13. The system of claim 9, wherein the first and second platforms are established by a server.

* * * * *

UNITED STATES PATENT AND TRADEMARK OFFICE
CERTIFICATE OF CORRECTION

PATENT NO. : 7,047,276 B2
APPLICATION NO. : 10/000550
DATED : May 16, 2006
INVENTOR(S) : Liu et al.

It is certified that error appears in the above-identified patent and that said Letters Patent is hereby corrected as shown below:

<u>Column 7</u>

Claim 1, line 19, between "else," and "step" insert therefor --the--

Claim 1, line 43, delete "for" and insert therefor --from--

Claim 1, line 48, delete "from" and insert therefor --form--

<u>Column 8</u>

Claim 9, line 38, delete "tile" and insert therefor --file--

Signed and Sealed this

Twenty-second Day of August, 2006

JON W. DUDAS
*Director of the United States Patent and Trademark Office*